United States Patent [19]

Dalrymple

[11] Patent Number: 4,791,595

[45] Date of Patent: Dec. 13, 1988

[54] DIGITAL VECTOR GENERATION WITH VELOCITY CORRECTION BY TABULATION OF COUNTER CONTROL SIGNALS

[75] Inventor: John C. Dalrymple, Portland, Oreg.

[73] Assignee: Tektronix, Inc., Beaverton, Oreg.

[21] Appl. No.: 884,572

[22] Filed: Jul. 11, 1986

[51] Int. Cl.[4] .............................................. G06F 1/02
[52] U.S. Cl. .................................... 364/719; 364/521
[58] Field of Search ................ 364/719, 521; 340/739, 340/740

[56] References Cited

U.S. PATENT DOCUMENTS

| | | | |
|---|---|---|---|
| 3,691,551 | 9/1972 | Kashi | 364/719 X |
| 3,952,297 | 4/1976 | Stauffer et al. | 340/740 |
| 4,027,148 | 5/1977 | Rosenthal | 364/719 |
| 4,228,510 | 10/1980 | Johnson et al. | 340/739 X |
| 4,330,834 | 5/1982 | Murphy | 364/521 |
| 4,458,330 | 7/1984 | Imsand et al. | 364/900 |
| 4,481,605 | 11/1984 | Chase | 364/719 |
| 4,553,214 | 11/1985 | Dettmer | 364/521 |
| 4,580,236 | 4/1986 | Tsujioka et al. | 364/719 |

OTHER PUBLICATIONS

Newman et al., "Principles of Interactive Computer Graphics", Second Edition, McGraw-Hill Book Comp., N.Y., 1979, pp. 20-27.
Bradon, "Vector Generation for Directed Beam Cathode Ray Tube", IBM Tech. Disclosure Bull., vol. 20, No. 10, 3/1978, pp. 4155-4156.

Primary Examiner—Gary V. Harkcom
Assistant Examiner—Tan V. Mai
Attorney, Agent, or Firm—Allston L. Jones; Robert S. Hulse

[57] ABSTRACT

Method and apparatus for drawing vectors on limited precision display devices in amounts of time approximately proportional to the vector's geometric length. Vectors are drawn by a series of strokes. Each stroke is a series of counter control signals, each signal representing a vertical, horizontal, or diagonal movement of the CRT electron beam between adjacent addressable screen points. The counter control signals making up the strokes are stored on a look-up table.

7 Claims, 2 Drawing Sheets

STATE TRANSITION TABLE FOR CONTROL BLOCK 70

| Q | START VG | PUMP COUNTER = 1 | STROKE COUNTER = 0 | Q* |
|---|---|---|---|---|
| 0 | 0 | 0 | 0 | 0 |
| 0 | 0 | 0 | 1 | 0 |
| 0 | 0 | 1 | 0 | 0 |
| 0 | 0 | 1 | 1 | 0 |
| 0 | 1 | 0 | 0 | 1 |
| 0 | 1 | 0 | 1 | 1 |
| 0 | 1 | 1 | 0 | 1 |
| 0 | 1 | 1 | 1 | 1 |
| 1 | 0 | 0 | 0 | 1 |
| 1 | 0 | 0 | 1 | 1 |
| 1 | 0 | 1 | 0 | 1 |
| 1 | 0 | 1 | 1 | 0 |
| 1 | 1 | 0 | 0 | 1 |
| 1 | 1 | 0 | 1 | 1 |
| 1 | 1 | 1 | 0 | 1 |
| 1 | 1 | 1 | 1 | 0 |

Q = CURRENT STATE

Q* = NEXT STATE

DIGITAL VECTOR GENERATION WITH VELOCITY CORRECTION BY TABULATION OF COUNTER CONTROL SIGNALS

BACKGROUND

This invention relates to the graphic display of line segments, and more particularly, to the generation of digital approximations of line segments on limited precision display devices.

Straight line segments, or vectors, are used a great deal in computer generated drawings. They occur in block diagrams, bar charts and graphs, civil and mechanical engineering drawings, logic schematics, and architectural plans, to name a few examples of commonly displayed drawings. Furthermore, curves can be approximated quite effectively by sequences of short straight line segments.

The precision of digitally generated displays, e.g. cathode-ray tube (CRT) displays, is limited by the density, or number, of addressable points in the display area, or screen. Consequently, line segments, or vectors, must be approximated by a concatenation of short horizontal, vertical, and diagonal line segments, referred to herein as "pumps," drawn between adjacent addressable points on the screen. The choice of points for such an approximation is often determined by a digital differential analyzer (DDA), an algorithm which generates a sequence of ordered pairs of numbers which indicate the subsequent adjacent addressable point to which the electron beam is directed from the current point in order to approximate a given line segment, Newman and Sproull, *Principles of Interactive Computer Graphics*, Second Edition (McGraw-Hill Book Company, New York, 1979), pgs. 20-27. Typically, the input to the DDA is the starting coordinates of a vector, the vector's component in the horizontal, or X, direction, and the vector's component in the vertical, or Y, direction.

Digital vector generators are hardware digital systems for implementing DDAs. Digital vector generators produce the X and Y coordinate signals which direct a CRT electron beam from addressable point to addressable point in order to draw a DDA-approximation to a line segment on the CRT screen. Currently used digital vector generators draw every pump at the same rate, regardless of whether it is vertical, horizontal, or diagonal. The pump-per-unit-time rate is constant, but the amount of phosphor traversed per unit time varies. In other words, the velocity at which the CRT electron beam traverses the screen phosphor varies depending on whether it is making a diagonal, or horizontal or vertical sweep. Consequently, in random-scanned CRT displays diagonal vectors appear less bright than horizontal or vertical vectors because the CRT electron beam deposits fewer electrons per unit length of phosphor along the longer diagonal pump paths than the shorter vertical or horizontal pump paths. The difference in brightness is quite discernable in vectors having slopes near forty-five degrees.

The foregoing illustrates a limitation of current display technology. It would be advantageous to provide an alternative digital vector generator to presently available devices which corrects, in whole or in part, the direction-dependent intensity differences between vectors.

SUMMARY OF THE INVENTION

In accordance with the present invention, vectors are generated by a series of strokes, each stroke being drawn in an amount of time approximately proportionate to its length. Strokes are sequences of pumps determined by the contents of a look-up table. The particular number of pumps in a stroke is not a critical feature of the invention; in different embodiments it can vary from a single pump to the total number of pumps in the vector to be drawn. However, as is described more fully below, a stroke length which results in a practical implementation of the look-up table is preferable.

In the preferred embodiment, the rate at which strokes are drawn is modified by uniformly substituting horizontal and vertical pumps for diagonal pumps in sequences of pumps, for example, generated by standard DDAs. The modified sequences are stored in a look-up table.

The X and Y components of vectors to be drawn are shift normalized to form first and second numbers respectively, each first and each second numbers having a fractional part (referred to herein as LX and LY, respectively) and a significant part (referred to herein as MX and MY, respectively), and the significant part having a predetermined number of significant bits. Vector generation takes place by executing two processes, referred to herein as the "stroking" process and the "carry" process. In the stroking process a sequence of pumps outputted by the look-up table is drawn by the CRT electron beam. In the carry process the fractional parts of the first and second numbers are added to themselves initially, and thereafter to the fractional parts (referred to herein as RX and RY, respectively) of first and second sums resulting from previous such additions, respectively. Carry bits generated by the additions in the carry process (referred to herein as CX and CY, respectively) form parts of the input addresses to the look-up table (along with the significant parts of the first and second numbers, MX and MY). The corresponding outputs of the look-up table determine the sequence of pumps in the next stroke. Each stroke is constrained to have a number of pumps equal to the integer nearest to its geometric length, thereby ensuring that vectors are drawn in amounts of time approximately proportional to their lengths. The precise sequence of vertical, horizontal, and diagonal pumps comprising a stroke is not critical to the invention. However, in preferred sequences each kind of pump is uniformly distributed throughout the sequence for maximal smoothness of the CRT image.

DESCRIPTION OF THE PREFERRED EMBODIMENT

Figure 1:
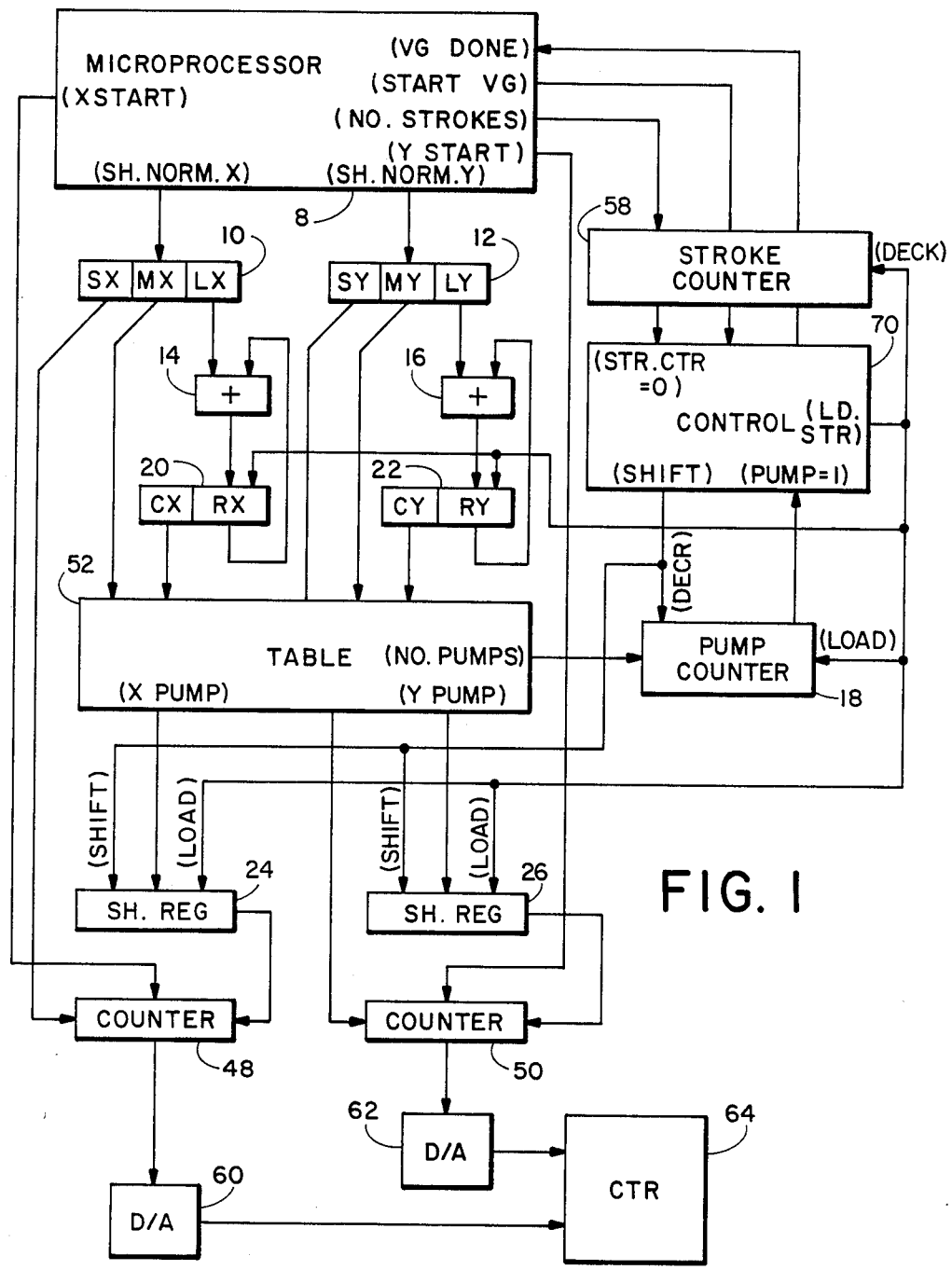
FIG. 1 diagrammatically illustrates a hardware implementation of the preferred embodiment.

The present invention includes method and apparatus for drawing vectors on random-scanned type CRTs, or like display devices, at nearly constant average velocity. Vectors are broken up into segments which are drawn by strokes. In the preferred embodiment velocity correction is accomplished stroke-wise by providing, by way of a look-up table, sequences of pumps which cause the CRT electron beam to take approximately equal time to draw strokes of equal length, regardless of their orientation.

The first step in drawing a vector is shift normalizing the binary representations of the X and Y components of the vector identically until the larger of the two components has a predetermined number of significant bits, i.e. a predetermined number of bits to the left of the binary point. In other words, shift normalizing involves moving the binary point in the integral binary representations of the X and Y components from their initial positions at the extreme right, bit position by bit position to the left until the predetermined number of significant bits exists in the larger component. Preferably, shift normalization can be accomplished by a microprocessor associated with the digital vector generator. Geometrically, shift normalizing divides the vector into $2^m$ segments, where m is the number of bit positions the binary point is shifted. Each segment is drawn on the CRT screen by a stroke. Preferably, the vector components are given in units of the CRT coordinate system, wherein a unit corresponds to the distance between adjacent horizontal or vertical addressable screen points. The magnitude of the predetermined number of significant bits is related to the size of the look-up table: the larger the predetermined number, the larger the look-up table.

Since the fractional parts of the shift normalized numbers (LX and LY) are generally non-zero, a calculation must be made to determine which addressable screen point lies closest to the end of the vector segment. The carry process comprises this calculation. The fractional parts of the shift normalized binary representations (LX and LY) are added to themselves initially, and thereafter to the fractional parts (RX and RY) of the first and second sums resulting from previous such additions. For each component, either a carry bit is generated, or not. That is, CX and CY are each either 1 or 0.

The significant bits (MX and MY) of the shift normalized components of the vector together with the carry bits (CX and CY) form the input values, or addresses, to the look-up table. The outputs of the look-up table are two sequences of 1's and 0's referred to herein as the X pump pattern and the Y pump pattern, and a signal (NO. PUMPS) representing the number of pumps in the currently outputted pump patterns. NO. PUMPS represents the nearest integer to the value of the following expression:

$$\sqrt{(MX + CX)^2 + (MY + CY)^2}$$

Taken together a pair of X and Y pump patterns can be viewed as a sequence of ordered pairs, wherein each ordered pair in the sequence represents either a vertical, horizontal, or diagonal pump. In terms of the CRT coordinate system vertical, horizontal, and diagonal pumps are represented by ordered pairs (0,1), (1,0), and (1,1), respectively.

The actual sequence of 1's and 0's making up the pump patterns stored in the look-up table can be determined in a number of ways. Again, the objective is to provide strokes which will be drawn in amounts of time approximately proportional to the repective geometric lengths of their corresponding vector segments, regardless or the segment's orientation on the CRT screen. For example, pump patterns can be constructed as follows. First, using a standard DDA, a sequence of pumps is generated for every possible combination of numbers represented by the significant parts of the first and second numbers. For example, if three significant bits are employed, the look-up table would contain $2 \times 2 \times 64$, or 256 pump patterns. The numbers determined by the significant parts of the first and second numbers are in the binary range of (0,111), or (0,7) decimal. Thus, there are $8 \times 8 = 64$ combinations of integers in this range, and the two carry bits each increase the number of pump patterns by a factor of 2. The pump patterns of the look-up table are usually constructed from the DDA-generated sequences by substituting horizontal and vertical pumps for single diagonal pumps. The number of substitutions made depends on the orientation of the vector to which the stroke corresponds. For example, in the extreme case of a diagonal vector, a straight forward calculation shows that approximately 41% of the diagonal pumps must be converted into sequences of adjacent vertical and horizontal pumps.

Preferably, X and Y pump patterns corresponding to particular values of MX, CX, MY, and CY are constructed as follows. First, an integer L is computed by rounding off the number given by the expression:

$$\sqrt{(MX + CX)^2 + (MY + CY)^2}$$

Next, a standard DDA, such as Bresenham's algorithm, is used to compute a sequence of ordered pairs for each of the vectors (MX+CX, L) and MY+CY, L). The sequence of Y coordinates, or second entries, from the sequence of ordered pairs for (MX+CX, L) is the X pump pattern, and the sequence of Y coordinates, or second entries, from the sequence of ordered pairs for (MY+CY, L) is the Y pump pattern. Bresenham's algorithm is disclosed in Bresenham, "Algorithm for Computer Control of a Digital Plotter," *IBM System J.*, Vol. 4, pgs. 25-30 (1965), and in most texts on computer graphics, e.g. Newman and Sproull, *Principles of Interactive Computer Graphics,* Second Edition (McGraw-Hill Book Company, New York, 1979). Bresenham's algorithm is also disclosed in U.S. Pat. Nos. 4,458,330 and 4,330,834.

FIG. 1 diagrammatically illustrates an implementation of the preferred embodiment. Counters 48 and 50 are first loaded by microprocessor 8 with the starting coordinates of the vector to be drawn (XSTART and YSTART). As these counters are incremented or decremented, as described below, they provide signals to digital-to-analog converters 60 and 62, respectively, which in turn, drive the deflection system of CRT 64.

Registers 10 and 12 are divided into three fields each, for holding SX, MX, LX, and SY, MY, and LY respectively. In microprocessor 8 the binary representations of the X and Y components of the vector to be drawn are converted into units of the CRT coordinate system, and are shift normalized to form signals SH. NORM. X and SH. NORM. Y. The SX and SY fields of registers 10 and 12 are loaded with SX and SY, respectively, which indicate the signs of the respective vector components. The SX and SY fields of registers 10 and 12 are connected to counters 48 and 50 respectively, and determine whether the respective counters increment or decremenet during a vector drawing operation. Counter 58 is loaded with a number, computed by microprocessor 8, that indicates the number of strokes in the vector (NO. STROKES). This number is determined by the number of binary point shifts required to shift normalize the vector components. For example, if m shifts are required, then the vector is divided into $2^m$ strokes. The significant bits of the shift normalized X and Y components are loaded by microprocessor 8 into the MX and MY fields of registers 10 and 12 respectively. These are the significant parts of the first and second numbers referred to above.

In setting up for vector generation, registers 20 and 22 are concurrently cleared and twice loaded after the respective delays of adders 14 and 16. Carry bits from the additions (if any are generated) are held in the CX and CY fields of registers 20 and 22, respectively. The fractional parts are held in the RX and RY fields of registers 20 and 22, respectively. Next, microprocessor 8 sends a begin vector signal (START VG) to controller 70. The MX and MY fields together with carry bits CX and CY act as inputs to look-up table 52, which may be implemented with standard ROMs, PLAs, logic circuitry, or the like. In response to input signals look-up table 52 (1) generates X and Y pump patterns, and (2) generates a signal (NO. PUMPS) corresponding to the number of pumps in the currently outputted stroke. In response to a control signal (LD. STROKE) generated by controller 70, counter 18 is loaded with NO. PUMPS, and shift registers 24 and 26 are loaded with an X pump pattern (X PUMP) and a Y pump pattern (Y PUMP), respectively. After loading, shift registers 24 and 26 are shifted right repeatedly and counter 18 is decremented repeatedly in response to a SHIFT signal generated by controller 70. Bits are shifted out of shift registers 24 and 26 and into the count enable ports of counters 48 and 50, respectively. Whether counters 48 and 50 increment or decrement in response to the shifted bits depends on the values of the sign bits in SX and SY of registers 10 and 12. When the SHIFT signal causes counter 18 to decrement to one it generates a signal which (1) causes counter 58 to decrement, and (2) indicates end of stroke to controller 70, i.e. the "pump counter = 1" signal referred to below becomes true. In response to "pump counter = 1" being true, i.e. at the completion of the stroking process, controller 70 generates signal LD. STROKE which (1) initiates another carry process, and (2) causes NO. PUMPS, X PUMP, and Y PUMP to be loaded in the appropriate registers or counters. In the carry process, adders 14 and 16 generate sums which are loaded into registers 20 and 22, and thereby generate new carry bits in the CX and CY fields. Thus, before the current stroke is completed new addresses have been inputted to look-up table 52, and new values for NO. PUMPS, and the X and Y pump patterns are available for loading into shift registers 24 and 26 in response to LD. STROKE without delay. When counter 58 is decremented to zero a signal ("stroke counter = 0" referred to below) is transmitted to controller 70 which, in turn, transmits an "end of vector" signal (VG DONE) to microprocessor 8.

Figures 2, 3:
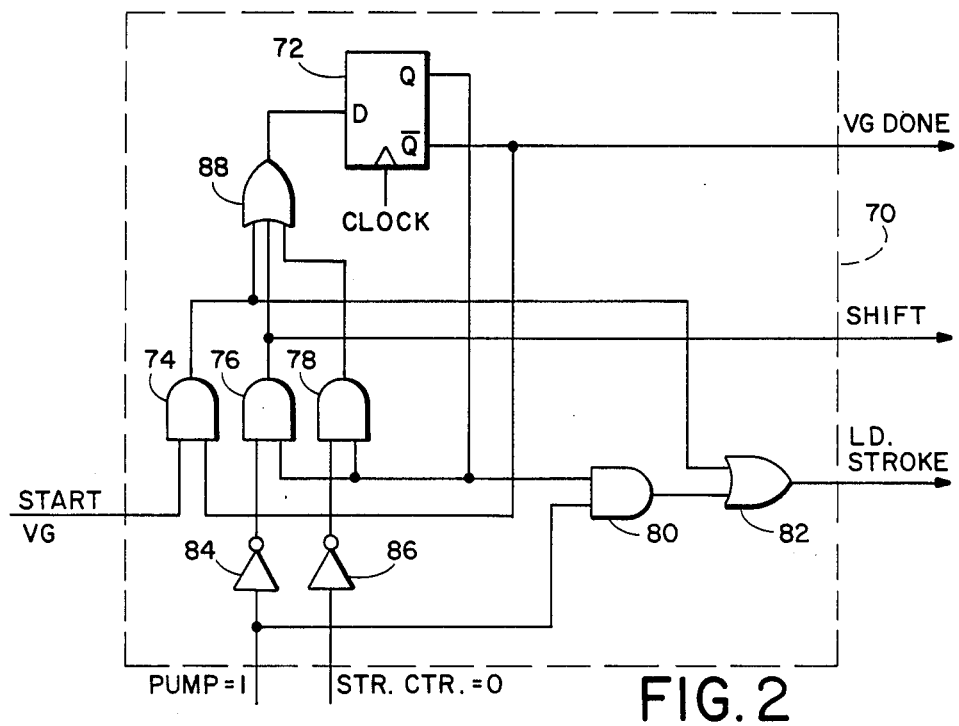
FIG. 2 is a state machine implementation of controller 70 of FIG. 1.
FIG. 3 is the state transition table for the state machine represented in FIG. 2.

FIG. 2 is a state machine implementation of controller 70, and FIG. 3 contains its corresponding state transition table. Positive logic is assumed, and the START VG for initiating a vector drawing cycle is assumed to be a synchronizing pulse exactly one clock cycle in duration. Flip flop 72 is reset at power up with D and Q low, and $\overline{Q}$ high. $\overline{Q}$ and START VG are input signals to AND gate 74. When AND gate 74 receives the START VG signal it generates a high signal which is received by OR gates 82 and 88. In response to this high signal OR gate 88 generates a high signal which raises the D input terminal of flip flop 72 to high. Consequently on the next positive-going clock edge Q becomes high, and $\overline{Q}$ becomes low. On succeeding clock cycles, as long as either input to the state machine, "pump counter = 1" or "stroke counter = 0", are false, flip flop 72 remains in that state. In response to the high signal generated by AND gate 74, OR gate 82 generates a LD. STROKE signal which causes shift registers 24 and 26 to load an X pump pattern and a Y pump pattern, respectively, from look-up table 52. Whenever "pump counter = 1" is false, a low signal is presented to inverter 84 which, in turn, presents a high signal to an input terminal of AND gate 76. Likewise, whenever "stroke counter = 0" is false, a low signal is presented to inverter 86 which, in turn, presents a high signal to an input terminal of AND gate 78. The other input terminals of AND gates 76 and 78 receive signals from the Q output terminal of flip flop 72. The output signal from AND gate 76 provides the SHIFT signal which causes pump counter 18 to decrement and shift registers 24 and 26 to shift bits to counters 48 and 50, respectively. Whenever "pump counter = 1" is true, AND gate 80 generates a high signal whenever Q is high. The high signal from AND gate 80 is received by OR gate 82 which, in turn, generates a LD. STROKE signal. Whenever "stroke counter = 0" and "pump counter = 1" are true simultaneously, AND gates 76 and 78 both generate low signals which make the D input terminal of flip flop 72 low which, on the succeeding clock pulse, cause Q to go low and $\overline{Q}$ to go high. D and Q terminals remain low for succeeding clock cycles until a new START VG signal is received by AND gate 74. $\overline{Q}$ high is the VG DONE signal which is received by microprocessor 8 to indicate the vector drawing cycle is complete.

The disclosure of the foregoing embodiment of the invention has been presented for purposes of illustration and description. It is not intended to be exhaustive or to limit the invention to the precise form disclosed; obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of generating a vector having an X component and a Y component, on a random-scanned cathode ray tube defining an X and a Y axis, the method comprising the steps of:

dividing the vector into segments, each segment having a geometric length; and drawing each segment by a stroke, each stroke comprising a sequence of pumps, and each sequence of pumps having a number of pumps wherein said number is a function of the geometric length and the angle with respect to the X axis of the segment to which said sequence of pumps and the stroke of which they are a part corresponds, with each stroke being drawn in an amount of time that is proportional to the geometric length of its corresponding segment.

2. The method of claim 1 wherein said step of dividing includes:

shift normalizing said X component and said Y component of said vector an identical extent so that a first number and a second number are formed, each such number having a fractional part, and each such number having a significant part having a predetermined number of significant bits, the first number being a normalized X component and the second number being a normalized Y component;

adding said fractional part of said first number to a first sum having a fractional part and a carry bit, and adding said fractional part of said second number to a second sum having a fractional part and a carry bit, wherein the initial first and second sums are said fractional parts of said first number and said second number respectively, and thereafter the first and second sums are the respective accumulations of previous such additions; and obtaining from a look-up table the significant parts of the first and second numbers and the carry bits of the first and second sums to said sequence of pumps.

3. The method of claim 2 wherein said step of drawing includes providing said sequence of pumps in said look-up table by substituting pairs of vertical and horizontal pumps for diagonal pumps in a sequence of pumps generated by a standard digital differential analyzer to form a modified sequence, the number of pumps in the modified sequence being approximately proportional to said geometric length of said segment of said vector.

4. The method of claim 3 wherein said step of providing includes making said substitutions of vertical and horizontal pumps uniformly along said sequence of pumps generated by said standard digital differential analyzer.

5. The method of claim 4 wherein said step of providing further includes:

computing an integer L for each value of said significant part of said first number (MX), said significant part of said second number (MY), said carry bit of said first sum (CX), and said carry bit of said second sum (CY), by rounding off to the nearest integer the value of the expression:

$$\sqrt{(MX + CX)^2 + (MY + CY)^2}$$

generating by a standard digital differential analyzer of MX and CX, and MY and CY, and each of their integers L, a first sequence of ordered pairs for the vector (MX+CX, L) and a second sequence of ordered pairs for the vector (MY+CY, L);

identifying the Y pump pattern for MX, MY, CX, and CY with the sequence of Y coordinates of the first sequence of ordered pairs; and identifying the Y pump pattern for the same MX, MY, CX, and CY with the sequence of Y coordinates of the second sequence of ordered pairs.

6. An apparatus for generating a vector having an X component and a Y component, on a random-scanned cathode ray tube, the cathode ray tube having a phosphor screen and an electron beam, the apparatus comprising:

shift normalizing means for forming a first number and a second number, each having a significant part and a fractional part, and the first number corresponding to the X component and the second number corresponding to the Y component of the vector;

adding means for adding the fractional part of the first number to a first sum having a fractional part and a carry bit, and adding the fractional part of the second number to a second sum having a fractional part and a carry bit, wherein the initial first and second sums are said fractional parts of said first number and said second number respectively, and thereafter the first and second sums are the respective accumulations of previous such additions;

a look-up table for generating sequences of pumps whenever the significant parts of the first number and the second number and the carry bits of the first sum and the second sum are received as input signals, the number of pumps in each said sequence being proportional to the geometric length of the vector; and means for directing the electron beam in accordance with the sequence of pumps generated by the look-up table.

7. The apparatus of claim 6 wherein said sequences of pumps in said look-up table are constructed by substituting pairs of vertical and horizontal pumps for diagonal pumps in sequences of pumps generated by a digital differential analyzer to normalize the velocity at which said electron beam draws said sequences of pumps.

* * * * *